(12) United States Patent
Hsieh

(10) Patent No.: US 8,111,450 B1
(45) Date of Patent: Feb. 7, 2012

(54) RHOMB BEAM SPLITTER IN OPTICAL COMMUNICATION

(75) Inventor: Yung-Chieh Hsieh, San Jose, CA (US)

(73) Assignee: Optoplex Corporation, Fremont, CA (US)

( * ) Notice: Subject to any disclaimer, the term of this patent is extended or adjusted under 35 U.S.C. 154(b) by 66 days.

(21) Appl. No.: 12/538,124

(22) Filed: Aug. 8, 2009

Related U.S. Application Data

(63) Continuation-in-part of application No. 12/505,483, filed on Jul. 18, 2009, now Pat. No. 8,004,749.

(60) Provisional application No. 61/092,118, filed on Aug. 27, 2008.

(51) Int. Cl.
*G02F 2/00* (2006.01)
*G02B 1/10* (2006.01)

(52) U.S. Cl. ........ 359/325; 356/477; 359/583; 359/584; 359/629; 398/188

(58) Field of Classification Search .................. 359/325, 359/577, 583, 584, 589, 629, 634; 356/450, 356/477; 398/183, 188, 201, 202, 208, 212
See application file for complete search history.

(56) References Cited

U.S. PATENT DOCUMENTS

| | | | | |
|---|---|---|---|---|
| 4,685,773 A * | 8/1987 | Carlsen et al. | ................ | 359/495 |
| 4,773,732 A * | 9/1988 | Schafer | ................. | 359/578 |
| 4,976,520 A * | 12/1990 | Brandstetter et al. | ......... | 359/107 |
| 5,155,606 A * | 10/1992 | Landesman | .................... | 359/29 |
| 5,162,944 A * | 11/1992 | Yamamoto et al. | ........... | 359/247 |
| 5,363,228 A * | 11/1994 | DeJule et al. | ................... | 398/45 |
| 5,381,250 A * | 1/1995 | Meadows | ....................... | 349/196 |
| 5,477,350 A * | 12/1995 | Riza et al. | ........................ | 349/24 |
| 5,877,876 A * | 3/1999 | Birdwell | ......................... | 349/39 |
| 6,337,934 B1 * | 1/2002 | Wu et al. | ......................... | 385/16 |
| 7,106,508 B2 * | 9/2006 | Du et al. | ....................... | 359/498 |
| 2010/0135677 A1 * | 6/2010 | Zaibel et al. | .................. | 398/208 |

* cited by examiner

*Primary Examiner* — Daniel Petkovsek
(74) *Attorney, Agent, or Firm* — Antonio R. Durando

(57) ABSTRACT

Rhomb beam splitters are used to implement various optical demodulators, in particular PSK and DPSK demodulators. The parallel beam-splitting and reflective surfaces of the rhomb structure produce reflection and transmission beams that exit the beam splitter parallel to one another and with a relative phase shift determined by the distance between the surfaces. These features afford the advantages of low cost, compactness, easily tunable, and temperature-insensitive optical structures for constructing a variety of optical demodulators.

23 Claims, 6 Drawing Sheets ary restatement of the disclosure that follows in the detailed description.

RHOMB BEAM SPLITTER IN OPTICAL COMMUNICATION

RELATED APPLICATIONS

This application is based on and claims the priority of U.S. Provisional Application Ser. No. 61/092,118, filed Aug. 27, 2008. This application is also a continuation-in-part application of U.S. Ser. No. 12/505,483, filed Jul. 18, 2009.

BACKGROUND OF THE INVENTION

1. Field of the Invention

This invention relates to phase-shift keying (PSK) and differential phase-shift keying (DPSK) in telecommunication. More specifically, it relates to the use of a rhomb beam splitter for converting a phase-keyed signal to an intensity-keyed signal in PSK and DPSK.

2. Description of the Prior Art

Phase-shift keying (PSK) is a digital modulation scheme that conveys data by changing, or modulating, the phase of a reference signal (the carrier wave). Any digital modulation scheme uses a finite number of distinct signals to represent digital data. In the case of PSK, a finite number of phases is used. Each of these phases is assigned a unique pattern of binary bits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal (such a system is termed coherent).

U.S. Ser. No. 11/729,004 and No. 12/174,628, hereby incorporated by reference, describe an implementation of PSK in an optical hybrid that includes a 50/50 un-polarized beam splitter, a folding prism, a beam shifter, a spacer and a phase shifter. From a signal beam S and a reference beam L directed into the optical hybrid, four outputs, S+L, S−L, S+jL and S−jL, are produced. The phase difference between the two interfering components of each output beam produced by the S and L beams in the optical hybrid is $\theta+0$, $\theta+90$, $\theta+180$, or $\theta+270$ degrees, where $\theta$ is the phase difference of the signal beam with respect to the reference beam.

Instead of using bit patterns to set the phase of the signal wave, in differential phase-shift keying (DPSK) modulation the patterns are used to set changes in the phase of the signal. The demodulator then determines the changes in the phase of the received signal rather than the phase itself. Since this scheme depends on the difference between successive phases, it is termed differential phase-shift keying. DPSK can be significantly simpler to implement than ordinary PSK because there is no need for the demodulator to have a copy of the reference signal to determine the exact phase of the received signal (i.e., it is a non-coherent scheme).

In telecommunication technology, DPSK has been implemented with various interferometric devices. In particular, the Mach-Zehnder interferometer and various embodiments of the Michelson interferometer have been used, such as described in co-owned U.S. application Ser. No. 11/360,959, No. 11/485,653, and No. 12/505,483, in a continuing effort to improve signal quality and manufacturing costs. The present invention teaches the advantageous use of the so-called rhomb beam splitter in various interferometer configurations for a variety of optical communication applications.

SUMMARY OF THE INVENTION

This invention is based on the idea of using so-called rhomb beam splitters to implement various optical hybrids, in particular for devices such as PSK and DPSK demodulators. Because of the advantages provided by the structural configuration of the rhomb beam splitter, such optical hybrids can be manufactured as low cost, compact, easily tunable and temperature-insensitive optical structures. Using a rhomb beam splitter, so long as the beam-splitting surface and the reflective surface of the rhomb structure are parallel and the entry and exit surfaces are flat, the reflection and transmission beams exiting the beam splitter will remain parallel to each other and will exhibit a relative phase shift determined by the distance between the surfaces. These features are the basis for the advantages afforded by the rhomb structure in constructing a variety of optical hybrids.

In one embodiment of the invention, a 2×4, 90-degree optical hybrid is implemented with three rhomb beam splitters and one cavity. The device combines two input beams to produce four outputs that result from interference of pairs of components with predetermined phase differences. A phase tuner in the optical train of one of the beams makes it possible to tailor the phase difference between interfering beams to meet the specifications requirements for different applications.

This basic structure is also used in various diversity schemes to enhance the performance of a communication system. For example, in order to split the signal into two orthogonal polarization states before demodulation, two upfront rhomb polarization beam splitters (PBSs) are added to the three rhomb beam splitters and one cavity of the structure to produce a 2×8, polarization-diversity optical hybrid. The PBSs are used to produce two orthogonal polarizations in the signal as well as the reference beam. In a related embodiment, the polarization function is implemented in the beam splitting surface receiving the four beams produced by the additional upfront splitters.

In yet another embodiment of the invention, a DPSK demodulator is constructed with two un-polarized rhomb beam splitters and a cavity. The difference in the optical path lengths of the reflected and transmitted beams inherently provided by the structure of the rhomb splitter is exploited to implement the function of a DPSK demodulator. In a related DPSK modulator embodiment, one of the rhomb beam splitters is inverted, thereby producing DLI arms of equal optical path length. A delay element is therefore added in the optical cavity to provide the required phase delay for demodulator operation.

In all embodiments, the devices are preferably constructed with materials having the proper optical and thermal properties to render them athermal. However, a thermal phase tuner may be used to tune the device in response to phase shifts due to thermal effects on the device, and a corresponding compensator made of the same material and thickness as the phase tuner may be used to compensate for the thermal drift of the phase tuner introduced by environmental causes.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

Figure 1A:
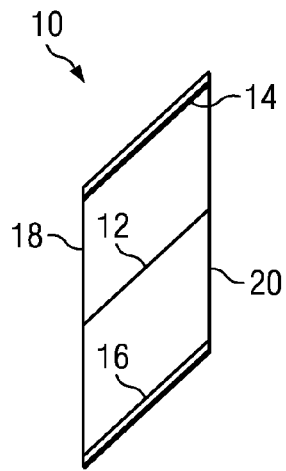
FIGS. 1A and 1B illustrate schematically the structures of conventional Rhomb beam splitters.
Figure 1B:
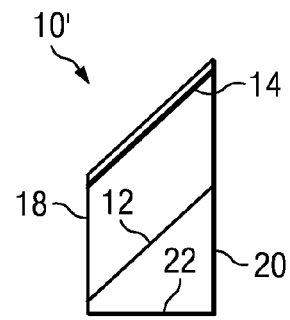

Referring to the figures, wherein like reference numerals and symbols are used throughout to refer to the same components, FIGS. 1A and 1B illustrate schematically two alternative structures of a rhomb beam-splitter structure, as that optical device is understood in the art. The structure 10 of FIG. 1A is characterized by the presence of a beam splitting surface 12 and two parallel mirror surfaces 14,16 defined by the top and bottom faces of the structure, respectively. The two entry and exit outer faces 18,20 are typically parallel to each other, though one skilled in the art will recognize that the critical feature in most applications is only that they be flat. The structure 10' of FIG. 1B is characterized by the presence of a beam splitting surface 12 and only one parallel mirror surface 14, the other mirror surface 22 being oriented in a non-parallel direction. If the outer faces 18, 20 and 22 are used for transmission, they are preferably coated with an anti-reflection coating. The beam-splitting surface 12 may be a UBS (un-polarized beam splitter) or a PBS (polarization beam splitter).

Figure 2A:
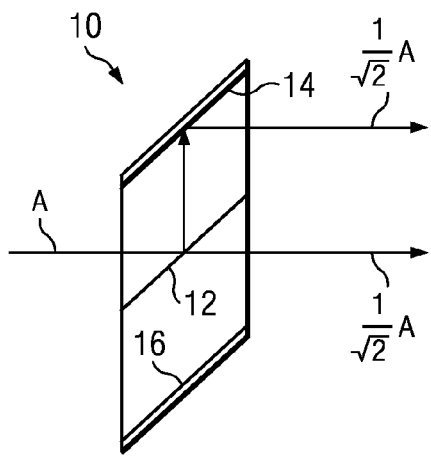
FIGS. 2A and 2B illustrate the power ratios in the beams split by the structures of FIGS. 1A and 1B.
Figure 2B:
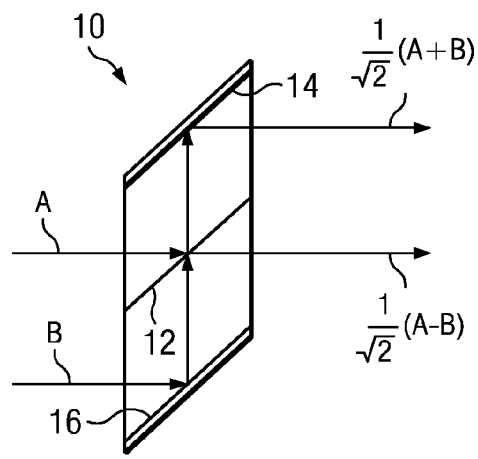

FIGS. 2A and 2B illustrate the use of the structure of FIG. 1A as a beam splitter and a beam combiner, respectively. In FIG. 2A, because the mirror surface 14 and the un-polarized beam-splitting surface 12 are parallel, the two output beams O1 and O2 produced by passing the input beam A through the rhomb beam splitter are parallel to each other. The beam splitting ratio determines the power of each output beam (illustrated as 50/50, producing outputs of electric field $$\frac{1}{\sqrt{2}}A\bigg).$$

Note that the same function could be achieved as well with the rhomb beam splitter 10' of FIG. 1B because only one reflective surface is utilized. In FIG. 2B, two input beams A and B are combined to produce two output beams of electric field $$\frac{1}{\sqrt{2}}(A+B)$$

and $$\frac{1}{\sqrt{2}}(A-B).$$

If the beam splitter coating is dielectric (i.e., it does not absorb), the phase difference between the beams that produce one output of the structure 10' will be 180 degrees greater (or smaller) than the phase difference between the beams that produced the other output.

For the purposes of this disclosure, the term "rhomb" is used throughout for simplicity, but it is understood that the precise geometric definition of the beam-splitter structure defined by the beam-splitting surface and one parallel mirror (illustrated by elements 12 and 14 in the figures) is that of a parallelepiped (that is, a three-dimensional figure formed by six parallelograms, a parallelogram being a quadrilateral with two sets of parallel sides). However, as mentioned, the critical feature of the beam-splitter structures of the invention is that they must include a beam-splitting surface and a mirror surface that are parallel and entry and exit surfaces that are flat. Therefore, within these critical constraints, the invention is not to be limited to any particular form of beam-splitter structure even though the term rhomb, as commonly done in the art, will be used throughout for convenience to describe generally all forms that are suitable for practicing the invention.

Figure 3:
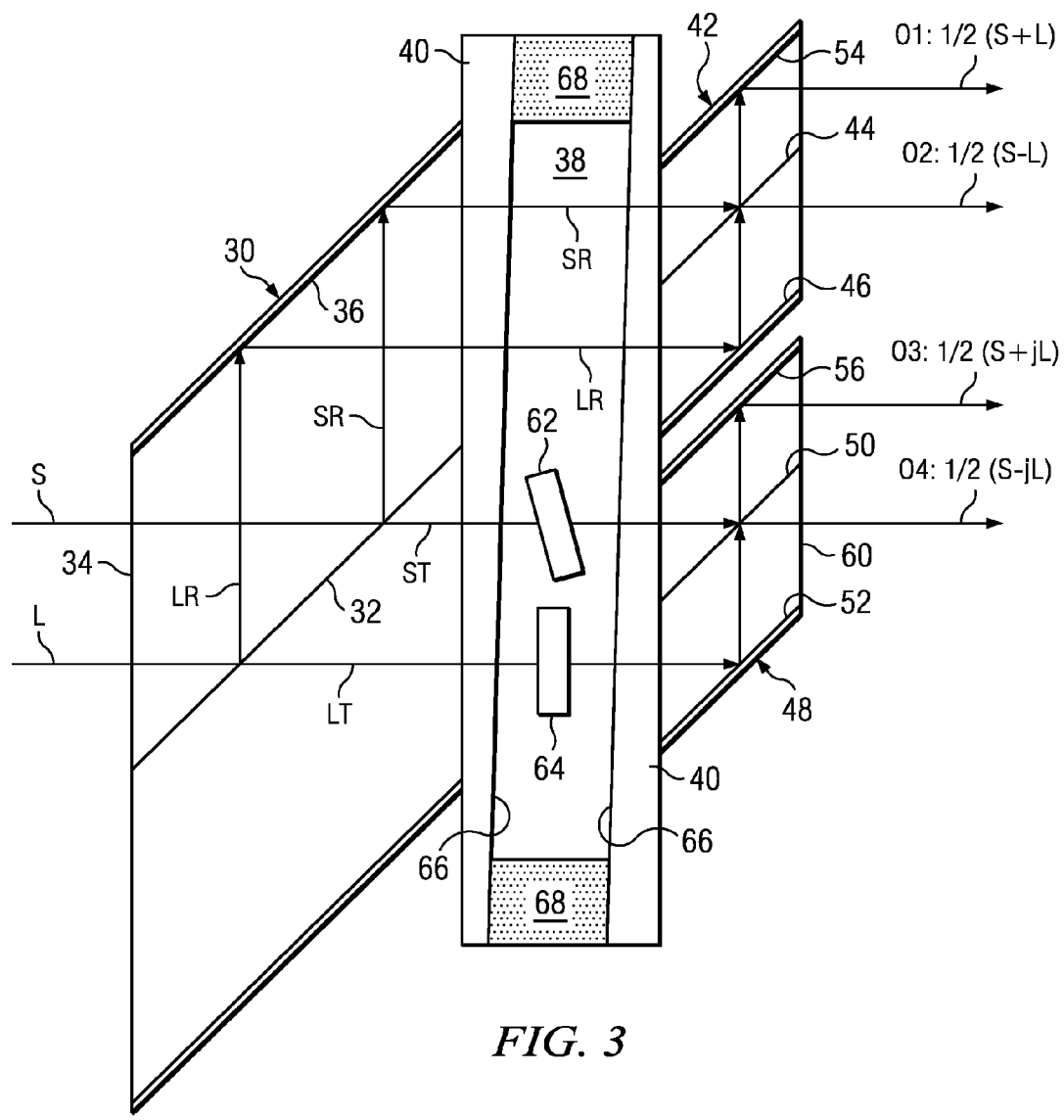
FIG. 3 illustrates an optical hybrid constructed with three rhomb beam splitters and one cavity.

FIG. 3 shows an optical hybrid constructed with three rhomb beam splitters and one cavity. Two input beams S and L (for signal and local oscillator, respectively) are directed toward the beam-splitting surface 32 of the first rhomb beam splitter 30 through its flat entry face 34. The S and L beams are split into respective reflection beams SR and LR, that are again reflected by mirror 36, and transmission beams ST and LT (all labeled with reference to their reflected or transmitted status). All four beams so produced are then passed through a cavity 38 defined by two opposite plates 40. The reflection beams SR,LR are directed into the second rhomb beam splitter 42 in respective alignments with its beam-splitting surface 44 and mirror surface 46. The transmission beams ST,LT are similarly directed into the third rhomb beam splitter 48 in respective alignments with its beam-splitting surface 50 and mirror surface 52. Finally, the beams reflected by the beam-splitting surfaces 44 and 50 are reflected again by mirror surfaces 54 and 56, respectively. Thus, four output beams O1,O2,O3,O4 are produced at the exit faces 58 and 60 of the second and third rhomb beam splitters.

One skilled in the art will readily recognize that the rhomb beam-splitter structure introduces a delay in the reflection beams that produces both constructive and destructive interference at the output. That is, the O1, O2, O3 and O4 outputs are characterized by an even distribution of energy represented by ½(S+L), ½(S−L), ½(S+jL) and ½(S−jL) combinations. The phase difference between each pair of interfering beams determines the amplitude of the resultant beam. Furthermore, as a result of energy conservation, the phase difference between the two beams interfering to produce O1 is 180 degrees greater (or smaller) than the phase difference between the two beams interfering to produce O2. The relationship also holds between O3 and O4. Thus, by adding a phase tuner 62 (which may be passive or thermally driven) in the cavity 38, it is possible to introduce a delay to adjust the phases such that the phase difference in the beams interfering to produce O1 will also be 90 degrees greater (or smaller) than the phase difference in the beams interfering to produce O3. Therefore, the same results hold between O2 and O4 and a very useful optical hybrid is obtained for telecommunication applications. A compensator plate 64 is preferably also used to compensate for the thermal drift of the phase tuner introduced by environmental causes. The cavity plates 40 are also preferably made as wedges with slightly slanted, parallel, opposing transmission surfaces 66 (the slant is exaggerated in the figures for illustration purposes only) such that the beams propagating through the cavity impinge on the surfaces with a non-zero angle of incidence in order to prevent ghost reflections. The length of the cavity 38 is determined in conventional manner by spacers 68 as needed for a particular application.

In the configuration of FIG. 3, after both input beams S and L are split at the beam-splitting surface 32, the reflection beams SR and LR follow the optical path of the upper arm and are reflected by mirror 36. The polarization-dependent phase change on reflection introduced by the mirror 36 is the same for both reflection beams SR and LR. Therefore, the mirror 36 does not affect the phase difference between the SR and LR beams as their polarizations change. If the mirrors 46 and 52 are the same, the effect of polarization-dependent phase change on reflection introduced by the mirror 46 on the pair of SR and LR beams and the effect of polarization-dependent phase change on reflection introduced by the mirror 52 on the pair of transmission beams ST and LT will also be the same. Therefore, the phase difference between the pair of transmission beams with respect to the phase difference between the pair of reflection beams remains the same for all polarizations. All of above renders the hybrid of this configuration less sensitive to polarization-dependent phase changes. Therefore, the mirrors 36, 46, and 52 can be implemented either with total internal reflection or with a polarization-insensitive coating. (A polarization-insensitive coating is defined as a coating that does not affect the polarization of an incident beam on reflection.)

Figure 4:
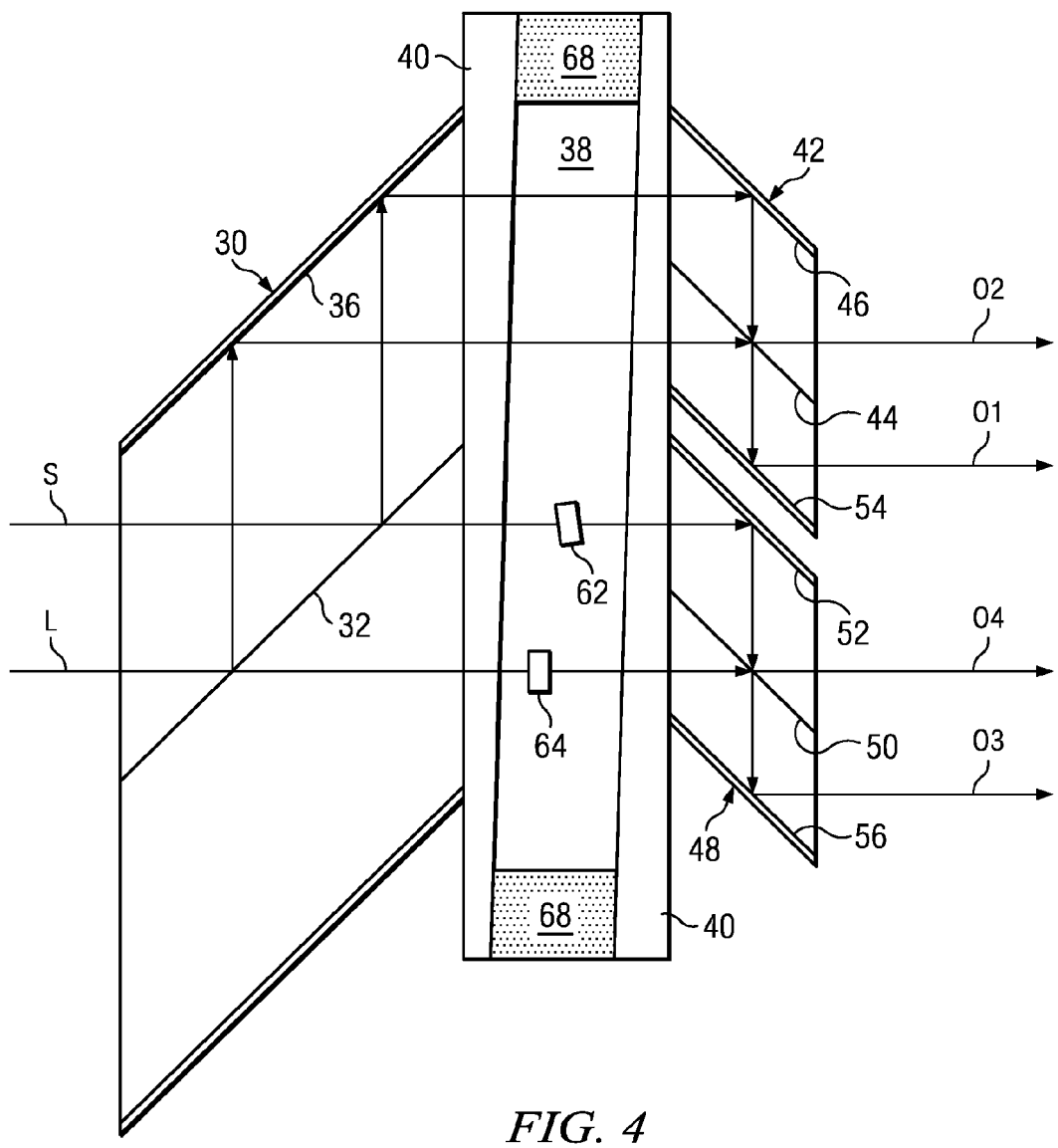
FIG. 4 illustrates an optical hybrid constructed with the same components of FIG. 3 where the position of the two exit rhomb beam splitters is inverted to reduce the size of the device.

FIG. 4 is an alternative structure for the optical hybrid of FIG. 3, wherein the second and third rhomb beam splitters 42,48 have been coupled to the structure of the cavity 38 in inverted manner in order to produce a more compact device. The functions of the two devices are the same.

Figure 5:
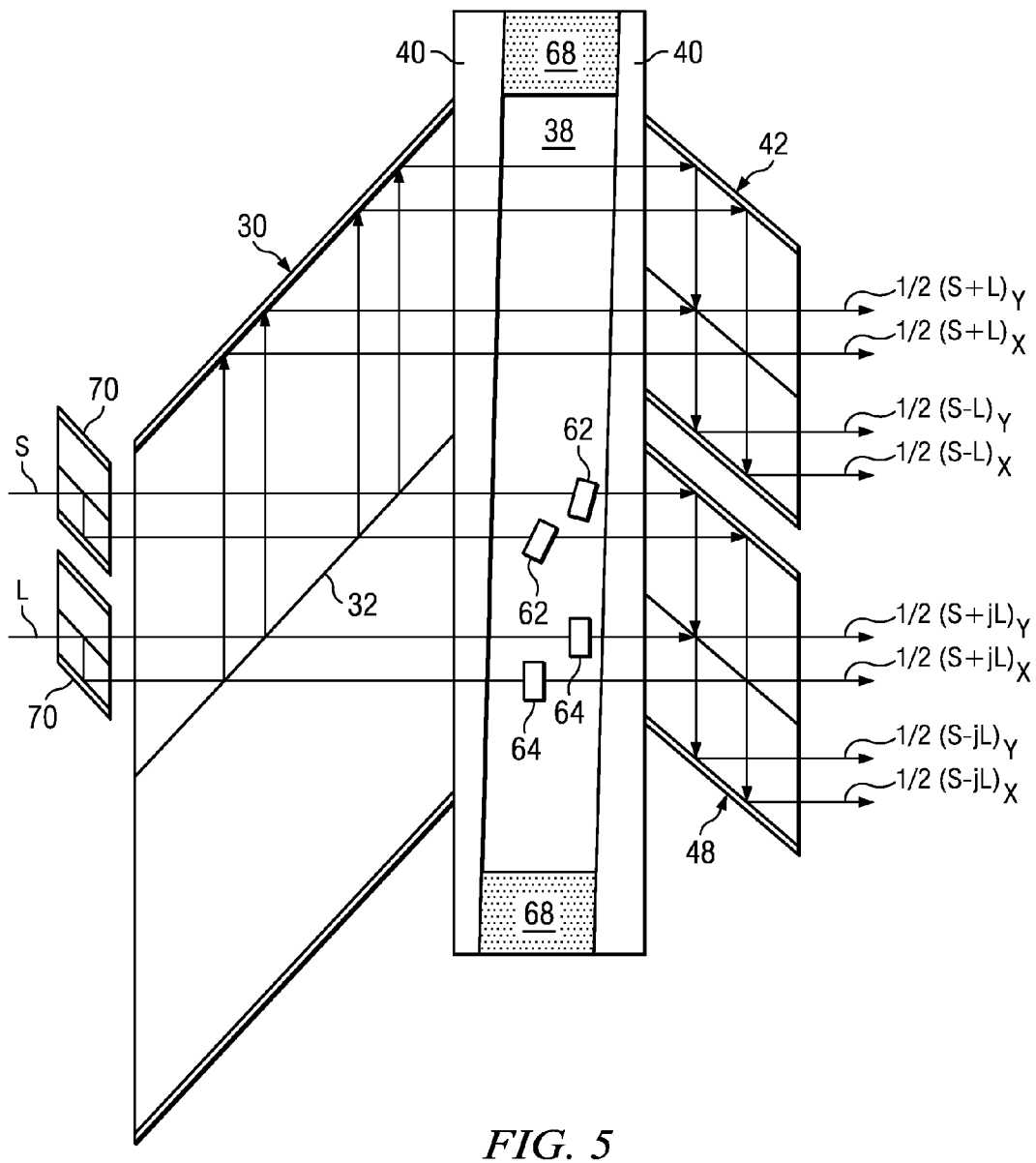
FIG. 5 is a 2×8 polarization-diversity optical hybrid wherein the two input beams to the device of FIG. 4 are first passed through respective polarizing rhomb beam splitters to produce two pairs of orthogonally polarized beams.

FIG. 5 illustrates an optical hybrid capable of producing eight polarization-diversity outputs utilizing the configuration of the device of FIG. 4 and two additional rhomb beam splitters. The additional rhomb beam splitters 70 are polarization splitters, each used to produce two orthogonally polarized x and y beams from the signal beam S and the local oscillator beam L. As the four resulting beams propagate through the splitter 30, the cavity 38, and the splitters 42 and 48, eight output beams are produced with energies corresponding to $½(S+L)_Y$, $½(S+L)_X$, $½(S-L)_Y$, $½(S-L)_X$, $½(S+jL)_Y$, $(S+jL)_X$, $½(S-jL)_Y$ and $½(S-jL)_X$, where x and y refer to the respective polarizations. This polarization-diversity optical hybrid is particularly useful, for example, for implementing secure communication because of the rapid polarization change in the signal, which enhances immunity to tapping or eavesdropping.

Figure 6:
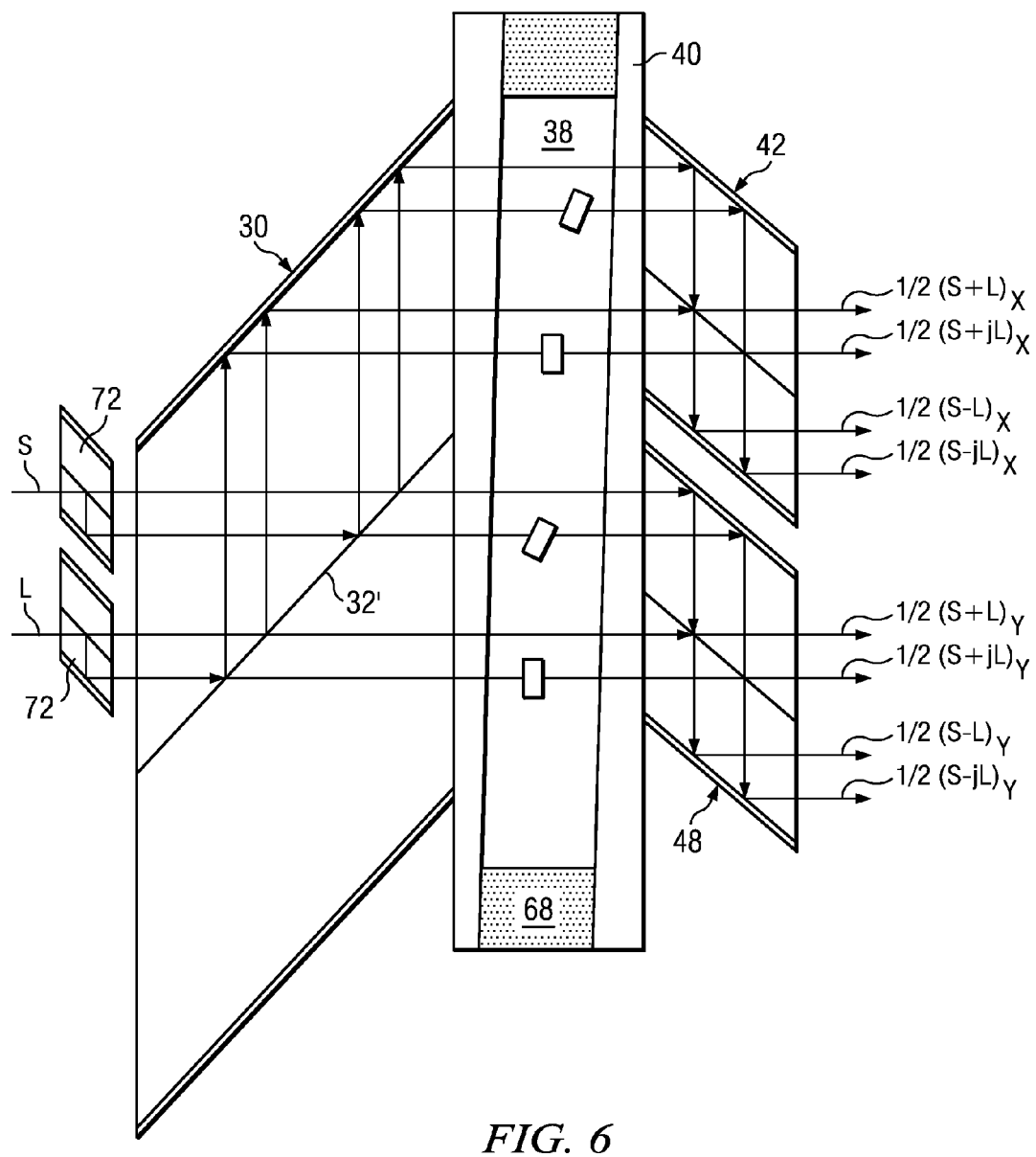
FIG. 6 is the same structure of FIG. 5 with the polarizing function being switched from the upfront rhomb beam splitters to the splitting surface of the rhomb beam splitter receiving the four beams produced by the input UBSs.

FIG. 6 illustrates an optical hybrid similar to the one of FIG. 5, except that the upfront rhomb beam splitters 72 are not polarizing and the beam-splitting surface 32' of the beam splitter 30 is instead polarizing. As a result, the eight output beams are produced with energies corresponding to $½(S+L)_X$, $½(S+jL)_X$, $½(S-L)_X$, $½(S-jL)_X$, $½(S+L)_Y$, $(S+jL)_Y$, $½(S-L)_Y$ and $½(S-jL)_Y$, where x and y refer to the respective polarizations.

Figure 7:
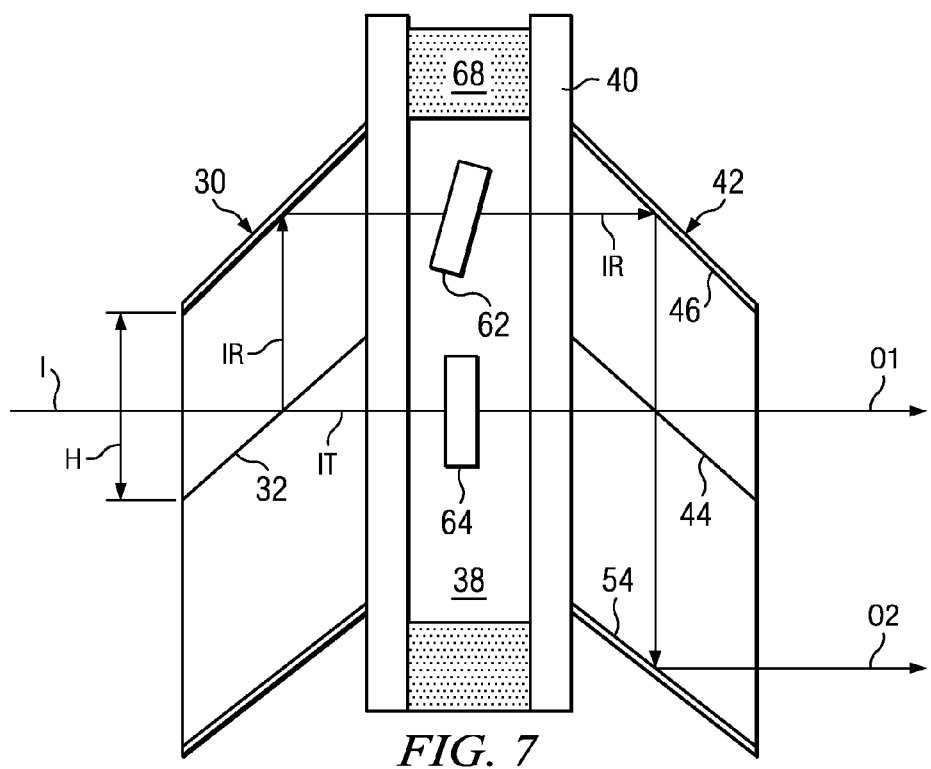
FIG. 7 illustrates a DPSK demodulator implemented with two un-polarized rhomb beam splitters, an optical cavity, a thermal phase tuner, and a compensator plate.

FIG. 7 illustrates a DPSK demodulator obtained from two rhomb beam splitters and an optical cavity. The input beam I is split by the 50/50 beam-splitting surface 32 of the first rhomb beam splitter 30 so that two equal beams IR,IT traverse the optical cavity 48 defined by plates 40 and spacers 68. Each beam then impinges on the second rhomb beam splitter 42 aligned so that the reflected beam IR is reflected by the mirror surface 46 toward the second beam-splitting surface 44. The transmitted beam IT also impinges on the beam-splitting surface 44 and produces two beams that interfere with the beams produced by splitting the beam IR. Because the IR beam has a longer optical path due to the distance H between the beam-splitting surfaces 32,44 and their respective mirror surfaces 30,46, a delay equal to 2nL, where n is the refractive index of the rhomb material, is introduced in one of the optical paths. As a result, the two outputs O1 and O2 can be utilized to demodulate a DPSK signal. As would be apparent to one skilled in the art, it is preferable to also use a phase tuner 62 to tune the transmittance spectrum of the demodulator (that is, to ensure that the central wavelength of interest is tracked). In such case, a compensator 64 would also be used, as discussed above.

In the configuration of FIG. 7, after the input beam I is split at the beam-splitter surface 32, the reflection beam IR following the optical path of the upper arm is reflected two more times (by mirrors 36 and 46) than the transmission beam IT following the lower arm. This causes a polarization-dependent phase error that is retained through the output of the device. Therefore, a corresponding phase correction is preferred and necessary for precision applications. The polarization phase compensation is achieved by a polarization-insensitive coating placed on mirror 36.

Figure 8:
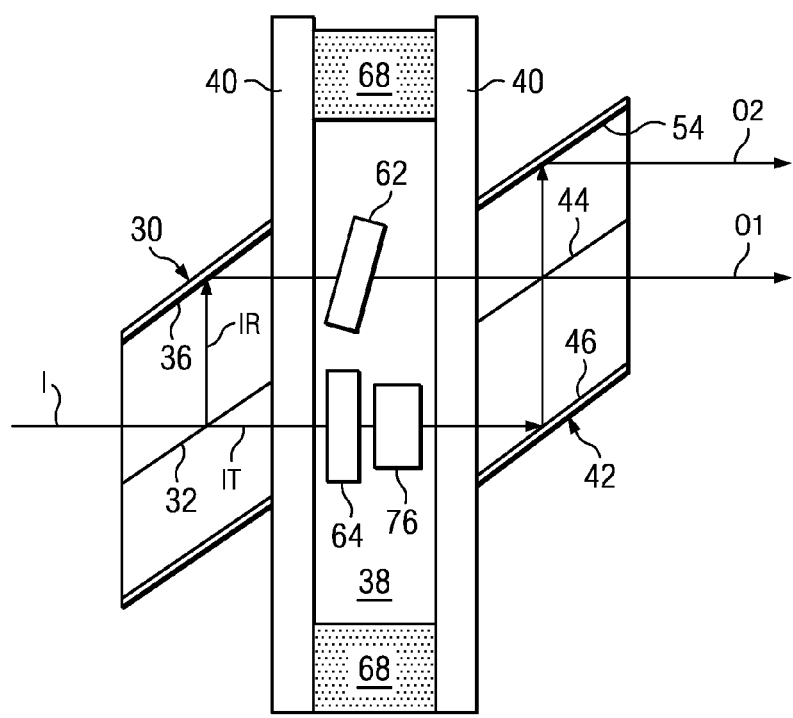
FIG. 8 illustrates a DPSK demodulator implemented with the same optical components of FIG. 7, but with one UBS in inverted position and the addition of a phase delay component.

FIG. 8 is a DPSK demodulator implemented with the same optical components of FIG. 7, but with the second rhomb UBS in inverted position. Because in such case both arms of the demodulator follow optical paths of equal length, a delay element 76 is introduced in either arm to produce the desired phase delay. The IR and IT beams are reflected by the mirrors 36 and 46, respectively. Both beams have the same polarization-dependent phase change on reflection. As a result, the effect of the phase change is cancelled out, which makes this DPSK demodulator less sensitive to polarization-dependent phase change. In both embodiments of FIGS. 7 and 8, the reflective surface 54 does not need to be parallel to the beam-splitting surface so long as parallelism of the output beams in not required. In other words, the rhomb beam splitter 10' of FIG. 1B could be used instead of the splitter 42.

As is well understood in the art, when the optical delay element 76 is inserted in the path of one of the beams, a delay interferometer is achieved. By judiciously selecting the material of the delay element (i.e., with the appropriate optical and thermal properties), an athermal DLI may be implemented. For example, if the delay element 76 consists of an athermal optical parallel plate with thickness d, the delay is equal to $(n-1)d$, where n is the refractive index of the material. The thermal phase tuner 62 is placed in the optical path of the reflection beam IR to tune the phase of the DLI. A microheater is incorporated into the tuner to vary its temperature as necessary to phase tune the DLI. The compensator 64, preferably a plate made of the same material as the phase tuner, is used to compensate for the thermal drift in the phase tuner introduced by the environment. The thickness of the compensator and the phase tuner can be determined in conventional manner. If the delay element 76 is made of an athermal material, the thickness of the compensator 64 should be the same as that of the phase tuner 62 to compensate for its intrinsic thermal drift (i.e., the amount of delay drift due to the changes in ambient temperature). If the delay element is not athermal, then the thickness of the compensator 64 should be different from that of the phase tuner, and it should be selected as required to minimize the intrinsic thermal drift of both the phase tuner and the delay element.

The examples above illustrate how the structure of a rhomb beam splitter can be used advantageously to construct optical hybrids for various telecommunication applications. Because the various components may be fabricated with high precision, made of selected materials with appropriate optical and thermal properties, and combined simply by means of optical contact, the devices of the invention are relatively inexpensive, compact, easily tunable, and thermally stable, all of which affords significant advantages over the prior art.

While the invention has been shown and described in what are believed to be the most practical and preferred embodiments, it is recognized that departures can be made therefrom within the scope of the invention. For example, the rhomb beam splitter of FIG. 1B could replace the splitter of FIG. 1A used in the illustrations whenever the direction of the output beams is not important. Therefore, the invention is not to be limited to the details disclosed herein, but is to be accorded the full scope of the claims so as to embrace any and all equivalent apparatus and methods.

What is claimed is:

1. An optical demodulator comprising:
   a first non-polarizing beam-splitting surface in a first optical structure having a first reflective surface parallel to the first non-polarizing beam-splitting surface;
   a cavity defined by a first plate in optical contact with an exit face of said first optical structure, a spacer, and a second plate;
   a second non-polarizing beam-splitting surface in a second optical structure having a second reflective surface parallel to the second non-polarizing beam-splitting surface, said second optical structure having an entry face in optical contact with said second optical plate; and
   a phase tuner in an optical path of said demodulator;
   wherein a reflection beam produced by said first non-polarizing beam-splitting surface is reflected by the first reflective surface and directed through the optical cavity to impinge on the second reflective surface, and a transmission beam produced by said first non-polarizing beam-splitting surface is directed through the optical cavity to impinge on the second non-polarizing beam-splitting surface; and
   wherein said first reflective surface, said second reflective surface and said second non-polarizing beam-splitting surface are positioned such that said reflection and transmission beams interfere.

2. The optical demodulator of claim 1, wherein said phase tuner is a thermal phase tuner.

3. The optical demodulator of claim 1, further including a compensator in said optical cavity to compensate for a thermal drift in the phase tuner.

4. The optical demodulator of claim 3, wherein said phase tuner is a thermal phase tuner.

5. The optical demodulator of claim 1, wherein said plates of the optical cavity include transmission surfaces positioned such that said reflection and transmission beams impinge thereon at a non-zero angle of incidence.

6. An optical demodulator comprising:
   a first non-polarizing beam-splitting surface in a first optical structure having a first reflective surface parallel to the first non-polarizing beam-splitting surface;
   a cavity defined by a first plate in optical contact with an exit face of said first optical structure, a spacer, and a second plate;
   a second non-polarizing beam-splitting surface in a second optical structure having a second reflective surface parallel to the second non-polarizing beam-splitting surface, said second optical structure having an entry face in optical contact with said second optical plate;
   a third beam-splitting surface in a third optical structure having a third reflective surface parallel to the third beam-splitting surface, said third optical structure having an entry face in optical contact with said second optical plate; and
   a phase tuner in an optical path of said demodulator;
   wherein a first reflection beam produced by said first non-polarizing beam-splitting surface is reflected by the first reflective surface and directed through the optical cavity to impinge on the second reflective surface, and a first transmission beam produced by said first non-polarizing beam-splitting surface is directed through the optical cavity to impinge on said third reflective surface;
   wherein a second reflection beam produced by said first non-polarizing beam-splitting surface is reflected by the first reflective surface and directed through the optical cavity to impinge on the second non-polarizing beam-splitting surface, and a second transmission beam produced by said first non-polarizing beam-splitting surface is directed through the optical cavity to impinge on said third beam-splitting surface;
   wherein said first reflective surface, the second reflective surface and the second non-polarizing beam-splitting surface are positioned such that said first and second reflection beams interfere; and
   wherein said first non-polarizing beam-splitting surface, the third reflective surface and the third beam-splitting surface are positioned such that said first and second transmission beams interfere.

7. The optical demodulator of claim 6, wherein said phase tuner in said optical cavity adjusts a phase difference between said transmission beams and said reflection beams.

8. The optical demodulator of claim 7, wherein said phase tuner is a thermal phase tuner.

9. The optical demodulator of claim 7, further including a compensator in said optical cavity to compensate for a thermal drift in the phase tuner.

10. The optical demodulator of claim 9, wherein said phase tuner is a thermal phase tuner.

11. The optical demodulator of claim 6, wherein said optical cavity includes transmission surfaces positioned such that said first and second reflection beams and said first and second transmission beams impinge thereon at a non-zero angle of incidence.

12. An optical demodulator comprising:
    a first beam-splitting surface in a first optical structure having a first reflective surface parallel to the first beam-splitting surface;
    a cavity defined by a first plate in optical contact with an exit face of said first optical structure, a spacer, and a second plate;
    a second beam-splitting surface in a second optical structure having a second reflective surface parallel to the second beam-splitting surface, said second optical structure having an entry face in optical contact with said second optical plate;

a third beam-splitting surface in a third optical structure having a third reflective surface parallel to the third beam-splitting surface, said third optical structure having an entry face in optical contact with said second optical plate;

a phase tuner in an optical path of said demodulator;

a fourth beam-splitting surface in a fourth optical structure having a fourth reflective surface parallel to the fourth beam-splitting surface; and a fifth beam-splitting surface in a fifth optical structure having a fifth reflective surface parallel to the fifth beam-splitting surface;

wherein:

said fourth and fifth beam-splitting surface are polarizing surfaces;

the fourth optical structure is adapted to split an input beam into a first input beam and a second input beam, the first input beam being directed toward said first beam-splitting surface to produce a first reflection beam and a first transmission beam, and the second input beam being directed toward said first beam-splitting surface to produce a second reflection beam and a second transmission beam;

the first reflection beam is reflected by the first reflective surface and directed through the optical cavity to impinge on the second reflective surface, and the first transmission beam is directed through the optical cavity to impinge on the third reflective surface;

the second reflection beam is reflected by the first reflective surface and directed through the optical cavity to impinge on the second reflective surface, and the second transmission beam is directed through the optical cavity to impinge on said third reflective surface;

the fifth optical structure is adapted to split another input beam into a third input beam and a fourth input beam, the third input beam being directed toward said first beam-splitting surface to produce a third reflection beam and a third transmission beam, and the fourth input beam being directed toward said first beam-splitting surface to produce a fourth reflection beam and fourth transmission beams;

the third reflection beam is reflected by the first reflective surface and directed through the optical cavity to impinge on the second beam-splitting surface, and the third transmission beam is directed through the optical cavity to impinge on the third beam-splitting surface;

the fourth reflection beam is reflected by the first reflective surface and directed through the optical cavity to impinge on the second beam-splitting surface, and the fourth transmission beam is directed through the optical cavity to impinge on said third beam-splitting surface;

said first reflective surface, said second reflective surface and said second beam-splitting surface are positioned such that said first and second reflection beams interfere with said third and fourth reflection beams, respectively; and said first beam-splitting surface, said third reflective surface and said third beam-splitting surface are positioned such that said first and second transmission beams interfere with said third and fourth transmission beams, respectively.

13. The optical demodulator of claim 12, wherein said phase tuner in said optical cavity adjusts a phase difference between said transmission beams and said reflection beams.

14. The optical demodulator of claim 12, wherein said phase tuner is a thermal phase tuner.

15. The optical demodulator of claim 12, further including a compensator in said optical cavity to compensate for a thermal drift in the phase tuner.

16. The optical demodulator of claim 15, wherein said phase tuner is a thermal phase tuner.

17. The optical demodulator of claim 12, wherein said optical cavity includes transmission surfaces positioned such that said first, second, third and fourth reflection beams and said first, second, third and fourth transmission beams impinge thereon at a non-zero angle of incidence.

18. An optical demodulator comprising:

a first beam-splitting surface in a first optical structure having a first reflective surface parallel to the first beam-splitting surface;

a cavity defined by a first plate in optical contact with an exit face of said first optical structure, a spacer, and a second plate;

a second beam-splitting surface in a second optical structure having a second reflective surface parallel to the second beam-splitting surface, said second optical structure having an entry face in optical contact with said second optical plate;

a third beam-splitting surface in a third optical structure having a third reflective surface parallel to the third beam-splitting surface, said third optical structure having an entry face in optical contact with said second optical plate;

a phase tuner in an optical path of said demodulator;

a fourth beam-splitting surface in a fourth optical structure having a fourth reflective surface parallel to the fourth beam-splitting surface; and a fifth beam-splitting surface in a fifth optical structure having a fifth reflective surface parallel to the fifth beam-splitting surface;

wherein:

said first beam-splitting surface is a polarizing surface;

the fourth optical structure is adapted to split an input beam into a first input beam and a second input beam, the first input beam being directed toward said first beam-splitting surface to produce a first reflection beam and a first transmission beam, and the second input beam being directed toward said first beam-splitting surface to produce a second reflection beam and a second transmission beam;

the first reflection beam is reflected by the first reflective surface and directed through the optical cavity to impinge on the second reflective surface, and the first transmission beam is directed through the optical cavity to impinge on the third reflective surface;

the second reflection beam is reflected by the first reflective surface and directed through the optical cavity to impinge on the second reflective surface, and the second transmission beam is directed through the optical cavity to impinge on said third reflective surface;

the fifth optical structure is adapted to split another input beam into a third input beam and a fourth input beam, the third input beam being directed toward said first beam-splitting surface to produce a third reflection beam and a third transmission beam, and the fourth input beam being directed toward said first beam-splitting surface to produce a fourth reflection beam and fourth transmission beams;

the third reflection beam is reflected by the first reflective surface and directed through the optical cavity to impinge on the second beam-splitting surface, and the third transmission beam is directed through the optical cavity to impinge on the third beam-splitting surface;

the fourth reflection beam is reflected by the first reflective surface and directed through the optical cavity to impinge on the second beam-splitting surface, and the fourth transmission beam is directed through the optical cavity to impinge on said third beam-splitting surface;

said first reflective surface, said second reflective surface and said second beam-splitting surface are positioned such that said first and second reflection beams interfere with said third and fourth reflection beams, respectively; and said first beam-splitting surface, said third reflective surface and said third beam-splitting surface are positioned such that said first and second transmission beams interfere with said third and fourth transmission beams, respectively.

19. The optical demodulator of claim 18, wherein said phase tuner in said optical cavity adjusts a phase difference between said transmission beams and said reflection beams.

20. The optical demodulator of claim 19, wherein said phase tuner is a thermal phase tuner.

21. The optical demodulator of claim 19, further including a compensator in said optical cavity to compensate for a thermal drift in the phase tuner.

22. The optical demodulator of claim 21, wherein said phase tuner is a thermal phase tuner.

23. The optical demodulator of claim 21, wherein said optical cavity includes transmission surfaces positioned such that said first, second, third and fourth reflection beams and said first, second, third and fourth transmission beams impinge thereon at a non-zero angle of incidence.

* * * * *